(12) United States Patent
Wells

(10) Patent No.: US 11,938,572 B2
(45) Date of Patent: Mar. 26, 2024

(54) METHOD FOR LOW HEAT INPUT WELDING ON OIL AND GAS TUBULARS

(71) Applicant: ATT Technology, Ltd., Houston, TX (US)

(72) Inventor: Austin J. Wells, Houston, TX (US)

(73) Assignee: ATT Technology, Ltd.

( * ) Notice: Subject to any disclaimer, the term of this patent is extended or adjusted under 35 U.S.C. 154(b) by 572 days.

(21) Appl. No.: 16/805,088

(22) Filed: Feb. 28, 2020

(65) Prior Publication Data

US 2021/0138570 A1     May 13, 2021

Related U.S. Application Data

(60) Provisional application No. 62/932,818, filed on Nov. 8, 2019.

(51) Int. Cl.
| | |
|---|---|
| *B23K 9/04* | (2006.01) |
| *B23K 1/00* | (2006.01) |
| *B23K 1/20* | (2006.01) |
| *B23K 3/047* | (2006.01) |
| *B23K 3/08* | (2006.01) |
| *B23K 20/24* | (2006.01) |
| *B23K 101/10* | (2006.01) |

(52) U.S. Cl.
CPC ............ *B23K 9/048* (2013.01); *B23K 1/0008* (2013.01); *B23K 1/20* (2013.01); *B23K 3/047* (2013.01); *B23K 3/085* (2013.01); *B23K 3/087* (2013.01); *B23K 20/24* (2013.01); *B23K 2101/10* (2018.08)

(58) Field of Classification Search
CPC ....................................................... B23K 9/04
See application file for complete search history.

(56) References Cited

U.S. PATENT DOCUMENTS

| | | | |
|---|---|---|---|
| 3,617,699 A | 11/1971 | Othmer | |
| 3,974,306 A | 8/1976 | Inamura et al. | |
| 3,980,859 A | 9/1976 | Leonard | |
| 4,194,031 A * | 3/1980 | Cullum ............... | E21B 17/1085 |
| | | | 219/76.1 |
| 4,258,242 A | 3/1981 | Fujimori et al. | |

(Continued)

FOREIGN PATENT DOCUMENTS

| | | | | |
|---|---|---|---|---|
| CN | 103781988 B | * | 12/2016 | ........... B23K 20/129 |
| CN | 108971806 A | * | 12/2018 | ........... B23K 10/027 |

(Continued)

OTHER PUBLICATIONS

PCT International Search Report for International Application No. PCT/US2020/020435 dated May 7, 2020 (2 pages).

(Continued)

*Primary Examiner* — Devang R Patel
(74) *Attorney, Agent, or Firm* — Clark Hill, PLC

(57) ABSTRACT

A method for continuously applying hardbanding to an oil and gas tubular or building up a worn oil and gas tubular that includes low heat input welding without compromising the mechanical properties of the tubular. The method includes preparation of the surface of the oil and gas tubular and applying a consumable wire to the surface. The consumable wire may be hardbanding or buildup material with a hardness that is similar to the hardness of the oil and gas tubular.

3 Claims, 5 Drawing Sheets

(56) References Cited

U.S. PATENT DOCUMENTS

| | | | | |
|---|---|---|---|---|
| 4,273,159 | A | * | 6/1981 | Bolton .................. B23K 9/046 |
| | | | | 175/325.1 |
| 4,597,456 | A | * | 7/1986 | Ecer ....................... E21B 10/50 |
| | | | | 175/371 |
| 4,687,899 | A | | 8/1987 | Acheson |
| 4,782,206 | A | * | 11/1988 | Ayres .................... B23K 9/048 |
| | | | | 219/76.12 |
| 5,900,079 | A | | 5/1999 | Ono et al. |
| 6,013,890 | A | * | 1/2000 | Hulsizer ............... B23K 9/048 |
| | | | | 219/125.11 |
| 6,291,079 | B1 | | 9/2001 | Mallen Herrero et al. |
| 6,375,895 | B1 | * | 4/2002 | Daemen .................. C22C 38/22 |
| | | | | 148/519 |
| 2007/0119829 | A1 | | 5/2007 | Vietz et al. |
| 2009/0258250 | A1 | * | 10/2009 | Daemen ............... F16L 58/182 |
| | | | | 228/101 |
| 2010/0084377 | A1 | | 4/2010 | Belloni et al. |
| 2011/0036814 | A1 | | 2/2011 | Ishigami et al. |
| 2015/0252631 | A1 | * | 9/2015 | Miller ................ E21B 17/1085 |
| | | | | 175/325.1 |
| 2017/0368629 | A1 | * | 12/2017 | Grigorenko ........ B23K 35/3073 |
| 2018/0161909 | A1 | | 6/2018 | Miller |
| 2019/0217411 | A1 | * | 7/2019 | Verrier ................. B23K 9/1087 |

FOREIGN PATENT DOCUMENTS

| | | | |
|---|---|---|---|
| CN | 110202241 | A | 9/2019 |
| EP | 3228413 | A1 | 4/2019 |
| EP | 3228413 | B1 | 4/2019 |
| WO | 2017132020 | A1 | 8/2017 |
| WO | 2018042171 | A1 | 3/2018 |
| WO | WO-2018042171 | A1 * | 3/2018 ............. B23K 35/30 |
| WO | WO-2019104427 | A1 * | 6/2019 ........... B23K 10/006 |

OTHER PUBLICATIONS

Written Opinion of the International Searching Authority for International Application No. PCT/US2020/020435 dated May 7, 2020 (15 pages).

Saudi Authority for Intellectual Property First Examination Report for Saudi Arabian Patent Application No. 20884155.1 dated Sep. 29, 2022 in Arabic (6 pages).

Response to First Examination Report for Saudi Arabian Patent Application No. 20884155.1 filed on Nov. 17, 2022 in Arabic (4 pages).

Saudi Authority for Intellectual Property Second Examination Report for Saudi Arabian Patent Application No. 20884155.1 dated Aug. 13, 2023 in Arabic (8 pages).

Response to Second Examination Report for Saudi Arabian Patent Application No. 20884155.1 filed on Dec. 11, 2023 in Arabic (6 pages).

First Office Action 16661 and Substantive Examination Report for Colombian Patent Application No. NC2022/0007243 dated Oct. 11, 2023 in Spanish (8 pages).

European Supplementary Search Report for European Patent Application No. 20884155.1 dated Oct. 12, 2023 (12 pages).

Singapore First Written Opinion Report for Singaporean Patent Application No. 11202204736V dated Oct. 27, 2023 (7 pages).

* cited by examiner

METHOD FOR LOW HEAT INPUT WELDING ON OIL AND GAS TUBULARS

BACKGROUND OF THE DISCLOSURE

1. Field of the Disclosure

The present disclosure relates to methods for welding on oil and gas tubulars, and, in particular, buildup material on new, used, or worn tubulars and applying hardbanding to oil and gas tubulars, including but not limited to workstring tubing connections, drill pipe tool joints, workstring tubing tube bodies, drill pipe tube bodies, drill collars, Non-Magnetic Drill Collars (NMDCs), and mud motor components. These applications are done with little or no preheat applied to the tubular and do not require slow-cooling.

2. Description of the Related Art

Workstring tubing joints are integral, meaning the connections are not friction welded to the tubes, as tool joints are with drill pipe. Despite this, the connections for workstring tubing are typically externally upset, meaning that the Outer Diameters (ODs) of the connections are greater than the ODs of the tubes, while the Inner Diameters (IDs) of the connections are typically the same as the IDs of the tubes. While being used downhole, the workstring tubing is typically rotated, causing wear to the externally upset connections. Typically, the entire joint of tubing must be scrapped when this wear causes a connection to have an OD that is less than the minimum acceptable dimension for that connection. Once workstring tubing joints are scrapped due to unacceptable ODs of externally upset connections, there are few if any methods to repair the connections.

One method that can be used to limit and even prevent wear to the externally upset connections from workstring tubing or drill pipe tool joints is to apply hardbanding to the externally upset connections. Hardbanding is typically applied using the Gas Metal Arc Welding (GMAW) method but can be applied with other welding methods as well. While GMAW can be performed at the manufacturing facility, it is typically done in the field.

With GMAW, the surface of a workstring tubing connection or drill pipe tool joint may be prepared for the application of weld material. Following the preparation of the surface, the surface must be preheated to between 150° F. and 350° F. based on the OD of the connection and/or its wall thickness. A lack of sufficient preheating will typically cause the hardness of the material within the Heat Affected Zone (HAZ) created by the heat of welding to be significantly high (at least 45 HRC) and potentially allow for the formation of untempered martensite in the HAZ, which can embrittle and compromise the tubular.

Each layer of weld material requires a substantial amount of time for cooling. It is common for GMAW to involve Direct Current Electrode Positive (DCEP) voltages of between 24 and 32 volts and amperages of between 280 and 320 amperes. The temperature of the base material may be measured after each welding pass to avoid metallurgical damage to the base material. The cooling may be managed through slow-cooling methods such as coverage with thermally insulating blankets, a cooling can, insulation, or a combination of these immediately after the completion of the application. The temperature of the base material must be measured to determine if the welded area has cooled down sufficiently for an additional layer of weld material to be applied. The blankets, cooling can, or insulation must remain on the welded area until the area has a temperature of less than 150° F. (down from about 850° F. at the end of the welding). A lack of slow-cooling will typically cause the hardness within the HAZ to be significantly high (at least 45 HRC) and potentially allow for the formation of untempered martensite in the HAZ, which can embrittle and compromise the tubular.

The acts of preheating and slow-cooling that are necessary for effective GMAW applications add time and create an undue burden to the welding process, thereby slowing and complicating large-scale welding applications. The consequences of improper preheating or slow-cooling are severe, as the connection and thus entire tubular may be compromised if cracking exists or has the potential to occur in the base material, including the HAZ.

Hardbanding is typically but not always applied in the raised condition, with the hardbanding protruding beyond the OD of the outer surface of the externally upset connection by around 3/32-inch to 5/32-inch (2.4 mm to 4.0 mm). When hardbanding is applied to the externally upset connections, the hardbanding, which is designed to be resistant to wear, wears slowly as the workstring tubing or drill pipe is used downhole. Once the hardbanding has worn to the point where its thickness is less than 1/32-inch (0.8 mm) above that of the unwelded OD of the outer surface of the externally upset connection, the hardbanding can be reapplied and the tubular can continue to be used without the base material of the connection ever being subjected to wear.

Most externally upset tubing connections have thin body walls—approximately 0.5 inch to 1.0 inch (12.7 mm to 25.4 mm)—that are much thinner than many drill pipe tool joints. Because of the thinness of the walls, the heat input from the GMAW method, and most other welding methods, is so severe that only one weave bead, approximately 1-inch (25.4 mm) in width, can be applied to the externally upset connection without a cooling interval or active cooling mechanism. When multiple weave beads are applied to a single workstring tubing connection using the GMAW method continuously (e.g. without any pause for slow-cooling and reapplication), the HAZ from the welding process penetrates through the entire body wall of the externally upset connection at its thickest point and significantly alters the base material hardness and thus the mechanical properties of the connection. Significant alteration may include the hardness in the HAZ being less than 20 HRC or greater than 45 HRC.

The thickness of many drill pipe tool joints allows for the typical continuous application of three adjacent weave beads, or even more using GMAW; however, this is not the case with smaller workstring tubing connections and drill pipe tool joints due to their smaller ODs (less than 5 inches (127.0 mm) or even 4 inches (101.6 mm)) and the resultant thinness of their walls.

Drill pipe and tubing may sometimes feature Internal Plastic Coating (IPC) adhered to the inner surface of the tube body of the drill pipe or tubing to prevent corrosion and erosion to the ID of the tube. This IPC can extend into the inner surface of the drill pipe tool or externally upset portion of the workstring tubing connection. The IPC may be applied to the inner surface of the tube body using an adhesive. The application of hardbanding using GMAW to tool joints or externally upset connections with IPC on the inner surface often results in damage to the IPC due to the high heat input of the welding process. Few, if any, successful methods exist that allow the application of hardbanding or buildup material on tool joints or externally upset connections with IPC on the inner surface.

The aforementioned methods are all in reference to the externally upset tubing connections and drill pipe tool joints, which have greater ODs than the those of the tube bodies and are therefore most commonly subjected to wear. However, the tube body of a workstring tubing joint, drill pipe joint, drill collar, NMDC, or mud motor component may also be subjected to significant wear, particularly if the tubular is bent or in the lateral section of the wellbore when used downhole. If the wall thickness of the tube body in any location is less than the required minimum dimension for that size and weight, then the entire joint of tubing or drill pipe is downgraded or scrapped.

Furthermore, many imperfections can exist on the tube body of a workstring tubing joint, drill pipe joint, drill collar, NMDC, or mud motor component. If these imperfections are deep enough, they can cause the entire tubular to be rejected.

No known methods exist to apply buildup material or hardbanding to a drill pipe or workstring tubing tube body to create raised wear pads or to repair the tube body, without altering the mechanical properties of the tube body, since the tube body is very thin compared with the externally upset connection or tool joint, with thicknesses as low as 0.113 inches (2.9 mm) or perhaps even lower. Applying any weave beads to the external surface of a tube body using the GMAW method or most other welding methods will significantly alter the base material hardness and thus the mechanical properties of the base material.

What is needed is a method of building up or adding hardbanding to oil and gas tubulars that can be performed with multiple passes continuously that does not compromise the mechanical properties of the oil and gas tubular.

BRIEF SUMMARY OF THE DISCLOSURE

In aspects, the present disclosure is related to methods for welding on oil and gas tubulars, and, in particular, for repairing or reinforcing new or worn tubulars and applying hardbanding to oil and gas tubulars.

One embodiment according to the present disclosure includes a method with the steps of: applying a wire to an oil and gas tubular using low heat input welding for multiple bands continuously. The method may also include cooling the oil and gas tubular in ambient air after welding. The low heat input welding may use direct current electrode positive voltages of between 12 and 24 volts and an electric current of between 150 and 300 amperes. The low heat input welding may use direct current electrode positive voltages of between 12 and 24 volts and an electric current of between 180 and 260 amperes. The low heat input welding may use direct current electrode positive voltages of between 12 and 20 volts and an electric current of between 150 and 300 amperes. The surface of the oil and gas tubular may be at a temperature of 150° F. or less during the application of the consumable wire. The consumable wire may be a hardbanding material or a buildup material. The tubular may have an internal plastic coating. The heat affected zone of the oil and gas tubular, after application of the wire, may be greater than 20 HRC and less than 45 HRC. The method may also include the steps of: grinding excess material from the applied wire until the outer diameter of the upset connection conforms to a preselected outer diameter; and grinding the external surfaces and/or recutting the threads of the upset connection. The method may include grinding excess material from weld material applied to an initial external taper of the upset connection and forming a new external taper that is parallel to the initial external taper. The method may also include the step of: preparing an outer surface of an oil and gas tubular, where the oil and gas tubular is one of: an upset connection and a tube body. The preparation step may include buffing the outer surface of the oil and gas tubular. The preparation step may include forming a recess in the outer surface of the oil and gas tubular through at least one of: grinding and machining. The method may include heating an outer surface of the oil and gas tubular to a temperature of 150° F. or less prior to applying the wire. The method may include applying the weld material when the to-be-welded surface is between −50° F. and 150° F. The method may include applying the weld material while the ambient cooling temperature is between −50° F. and 150° F.

Another embodiment according to the present disclosure includes an oil and gas tubular constructed by a process that includes applying a wire to the oil and gas tubular using low heat input welding for multiple bands continuously.

Examples of the more important features of the disclosure have been summarized rather broadly in order that the detailed description thereof that follows may be better understood and in order that the contributions they represent to the art may be appreciated. There are, of course, additional features of the disclosure that will be described hereinafter and which will form the subject of the claims appended hereto.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals.

DETAILED DESCRIPTION OF THE DISCLOSURE

Figure 1:
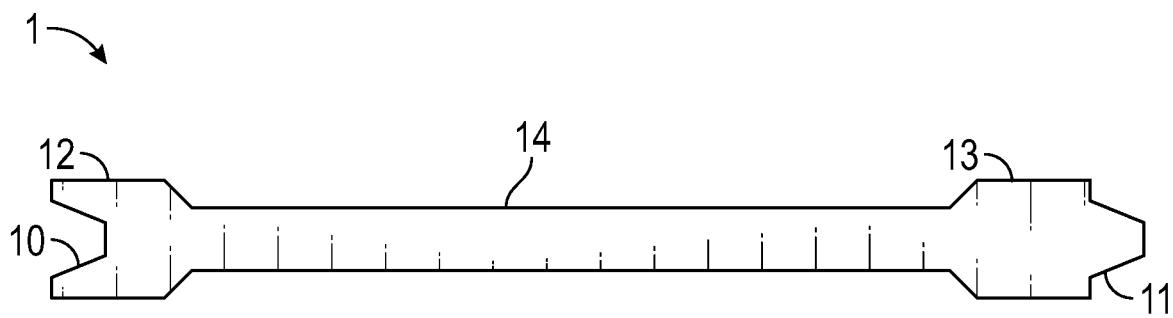
FIG. 1 shows a diagram of an oil and gas tubular with integrated externally upset connections, which are typical for a joint of drill pipe or a joint of workstring tubing.

Generally, the present disclosure relates to methods for welding on oil and gas tubulars, and, in particular, a low heat welding process to apply buildup material or hardbanding to tubulars.

The present disclosure is susceptible to embodiments of different forms. They are shown in the drawings, and herein will be described in detail, specific embodiments of the present disclosure with the understanding that the present disclosure is to be considered an exemplification of the principles of the present disclosure and is not intended to limit the present disclosure to that illustrated and described herein.

Definitions

"Low heat input welding process" is a process that adds less heat than the traditional GMAW process, such as, but not limited to, the Cold Metal Transfer (CMT) welding process. This process involves the application of little or no preheating.

"Oil and gas tubulars" are metal tubulars and their associated connections for use in oilfield operations, including, but not limited to, workstring tubing, drill pipe, drill collars, Non-Magnetic Drill Collars (NMDCs), and mud motor components. Oil and gas tubulars may include drill pipe tool joints (as defined by API Specification 5DP), drill pipe tube bodies (as defined by API Specification 5DP), tubing connections (as defined by API Specification 5CT), and tubing tube bodies (as defined by API Specification 5CT).

"Workstring tubing" is oil and gas tubing purposed for oilfield operations. Typically, the tubing includes, but is not be limited to, integral tubing with a tube body OD of about 2-⅜ inches (60.3 mm) or about 2-⅞ inches (73.0 mm). Some workstring tubing includes, but is not limited to, P110 grade tubing as defined by API Specification 5CT.

"Drill pipe" is an oil and gas tubular purposed for oilfield operations and may include, but is not limited to, S-135 grade drill pipe tubes as defined by API Specification 5DP. Drill pipe may be friction welded with upset tool joints. The drill pipe tubes and tool joints may have any OD, including, but not limited to, those from API Specification 5DP.

"Slick tubulars" are those oil and gas tubulars for which the connections have the same OD as the tube body. Some slick tubulars include, but are not limited to, drill collars, NMDCs, and mud motor components.

"Buildup material" is a material that may be welded to form a layer of metal on a base material with a typical hardness value within 10 HRC of the typical hardness value of the base material of the tubular to which it is applied. Pre-application buildup material may be in the form of a wire.

"Hardbanding" is a material that may be welded to form a layer of metal on a base material of a tubular and has a typical hardness value that is at least 15 HRC higher than the typical hardness value of the base material to which it is applied. Pre-application hardbanding material may be in the form of a wire.

"Base material" means the initial manufactured material of the tubular before buildup or the application of hardbanding. This includes, but is not limited to, P110 grade workstring tubing, both tube bodies and externally upset connections, drill pipe tool joints, and S-135 grade drill pipe tube bodies.

"Weld material" is either buildup material or hardbanding depending on the purpose of the welding application.

One embodiment of the method is for rebuilding and repair of workstring tubing connections and drill pipe tool joints. Workstring tubing connections and drill pipe tool joints are only acceptable if they meet dimensional requirements, including a minimum OD, from the manufacturer or the owner. While being used for drilling and completions operations, the connections typically wear, reducing their ODs. Once this wear causes the OD of the connection to be less than the minimum acceptable dimension for that connection, the entire joint of tubing or drill pipe must be scrapped.

The methods disclosed herein allow for these scrapped connections to be rebuilt by applying a buildup material along the entire externally upset length of each connection. While subsequent machining may be necessary, particularly for a workstring tubing connection, the connection can be restored to within acceptable specifications for use for its original purpose. The methods herein involve a low heat input welding process that does not compromise the hardness of the connection when buildup material is applied over the entire length of the connection, thereby solving this problem.

Another embodiment includes a method that allows for the enhanced protection of workstring tubing connections, drill pipe tool joints, and slick tubulars. One way to prevent wear on a connection or any part of a slick tubular is to apply raised hardbanding. This hardbanding slowly wears before the base material of the connection is subjected to wear and can be reapplied with welding.

If additional bands of hardbanding are applied to a workstring tubing connection or some drill pipe tool joints during a single application, the hardness of the base material will change significantly (e.g. material hardness decreasing below 20 HRC or increasing above 45 HRC). By using a low heat input welding process, the application of multiple, adjacent weave beads of hardbanding to a workstring tubing connection is possible without compromising the mechanical properties of the connection.

Another embodiment includes a method that allows for the enhanced protection of workstring tubing tube bodies and drill pipe tube bodies. During oil and gas operations, not only do connections become worn and rejectable, but the tube bodies of tubulars may as well. If the tube body wall thickness is reduced to less than the minimum acceptable dimension, the tube will be downgraded, reducing the value of the joint of tubing or drill pipe, or rejected for noncompliance resulting in the tubing or drill pipe to be scrapped. By using this low heat input welding process, the mechanical properties of the tube body will not be compromised when buildup material is applied to the tube body.

Another embodiment includes a method that allows for the repair of oil and gas tubulars, particularly the tube bodies of workstring tubing, drill pipe, or slick tubulars. Many imperfections can exist on the external surface of an oil and gas tubular. If these imperfections are deep enough, they can cause the entire tubular to be rejected and scrapped. The methods herein allow for the removal of these imperfections, and the low heat input welding process allows for the application of buildup material that is then ground and ultimately used to repair the tubular and restore it to a like-new condition.

Another embodiment includes a method that allows for the application of multiple weave beads to the external taper of an externally upset connection, such as that on workstring tubing or drill pipe tool joints. With subsequent grinding, this results in the effective extension of the external upset portion of the connection and thus allows for an increased number of repairs (recuts of threads).

Another embodiment includes a method that allows continuous weave beads to be applied to a slick tubular to repair it if the OD has been worn down to less than the minimum acceptable dimension. This ultimately repairs the tubular and restores it to a like-new condition.

Another embodiment includes a method that allows for the application of weld material to an externally upset connection or tool joint that has Internal Plastic Coating (IPC) adhered to its inner surface. The low heat input welding process will not cause damage to the IPC as is typical with GMAW applications.

The methods disclosed herein require no preheating before welding is performed. Slow-cooling is not required between welding passes, such that continuous welding is possible without compromising the mechanical properties of the base material. This means that the base material hardness in the HAZ is maintained between 20 and 45 HRC. In some embodiments, the base material hardness in the HAZ may be maintained between 24 and 42 HRC.

Various methods of applying buildup material and hardbanding to workstring tubing connections, drill pipe tool joints, workstring tubing tube bodies, drill pipe tube bodies, drill collars, NMDCs, and mud motor components are disclosed herein. Although the embodiments of the invention are particularly useful in the upstream oil and gas industry, they may also be useful in other industries that require applications of buildup material or hardbanding (or hardfacing) to thin tubulars or other thin components.

FIG. 1 shows a diagram of a typical tubular joint 1, which is representative of a joint of drill pipe or a joint of workstring tubing for oil and gas drilling and completions operations. The tubular 1 includes an externally upset box connection 10 and externally upset pin connection 11 integrated with and disposed on either side of a tube body 14. The externally upset box connection 10 has an outer surface 12 with an OD that is greater than the OD of the tube body 14. The externally upset pin connection 11 has an outer surface 13 with an OD that is greater than the OD of the tube body 14.

Figure 2:
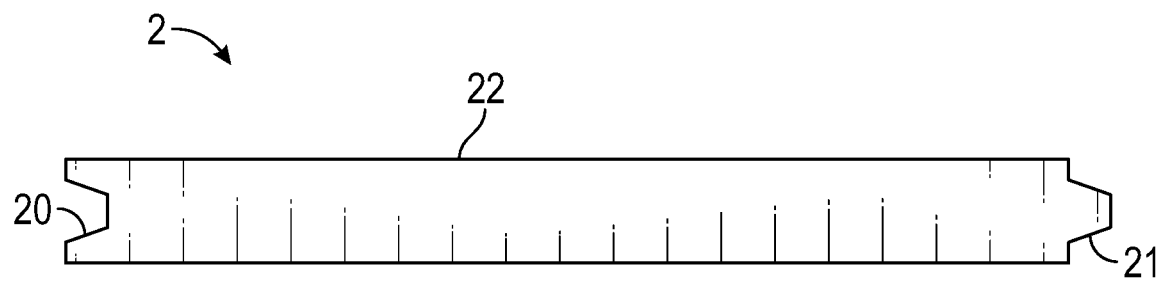
FIG. 2 shows a diagram of an oil and gas tubular with a slick body, meaning that the connections have the same OD as the tube body, which is typical of a drill collar, NMDC, or mud motor component.

FIG. 2 shows a diagram of a typical slick tubular 2, which is representative of a drill collar, NMDC, or mud motor component for oilfield operations. The tubular 2 includes a threaded box connection 20 and threaded pin connection 21 integrated and a slick tube body 22.

Figure 3:
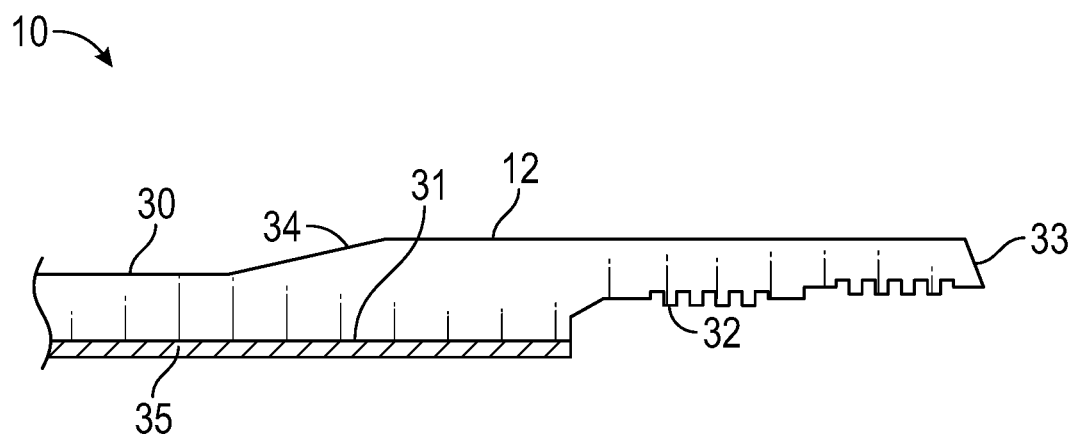
FIG. 3 shows a diagram of a cross section of half of an externally upset box connection that is part of a joint of the workstring tubing from FIG. 1.

FIG. 3 shows a diagram of a partial cross section of the externally upset box connection 10 connected to the tube body 14 from a joint 1 as shown in FIG. 1. The externally upset box connection 10 has an ID of its inner surface 31 that may match the ID of the tube body 14. An IPC coating 35, which is optional, is shown on the inner surface 31. The tube body 14 has an outer surface 30 with an OD that is less than the OD of the outer surface 12 of the externally upset box connection 10 due to the external taper 34. Thus, the thickness of the externally upset box connection 10 is the difference between the OD of the outer surface 12 and the ID of the inner surface 31, which is greater than the thickness of the tube body 14, which is the difference between the OD at the outer surface 30 and the ID at the inner surface 31. A portion of this thicker connection 10 may be removed to form threads 32 extending from a face 33 of the connection 10 toward the tube body 14 for make-up with another connection.

Figure 4:
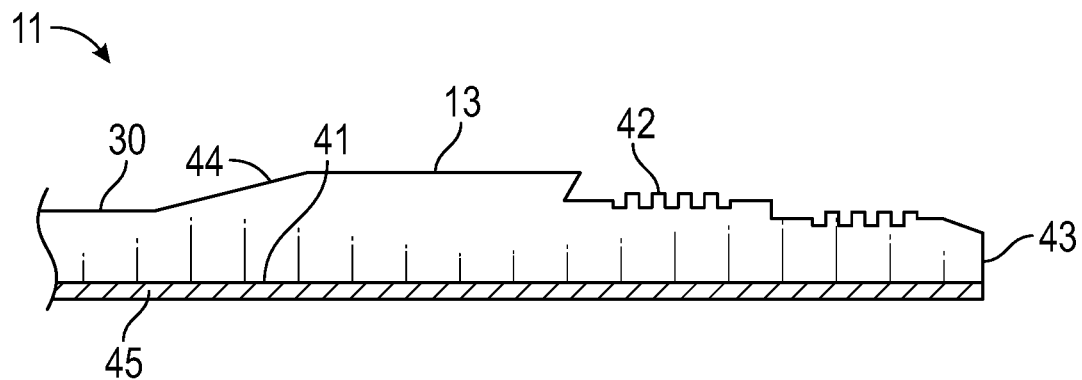
FIG. 4 shows a diagram of a cross section of half of an externally upset pin connection that is part of a joint of the workstring tubing from FIG. 1.

FIG. 4 shows a diagram of a partial cross section of the externally upset pin connection 11 connected to the tube body 14 from a joint 1 as shown in FIG. 1. The externally upset pin connection 11 has an inner surface 41 with an ID that may match the ID of the tube body 14. An IPC coating 45, which is optional, is shown on the inner surface 41. The OD of the tube body outer surface 30 is less than the OD of the outer surface 13 due to the external taper 44. Thus, the thickness of the externally upset pin connection 11 is the difference between the OD of the outer surface 13 and the ID at the inner surface 41, which is greater than the thickness of the tube body 14, which is the difference between the OD of the outer surface 30 and the ID at the inner surface 41. A portion of this thicker connection 11 may be removed to form threads 42 extending from a face 43 of the connection 11 toward the tube body 14 for interconnection.

Once the OD of the outer surface of an externally upset workstring tubing connection or drill pipe tool joint has been reduced below the required minimum acceptable dimension for that connection, the entire joint of workstring tubing or drill pipe is typically scrapped.

Figure 5:
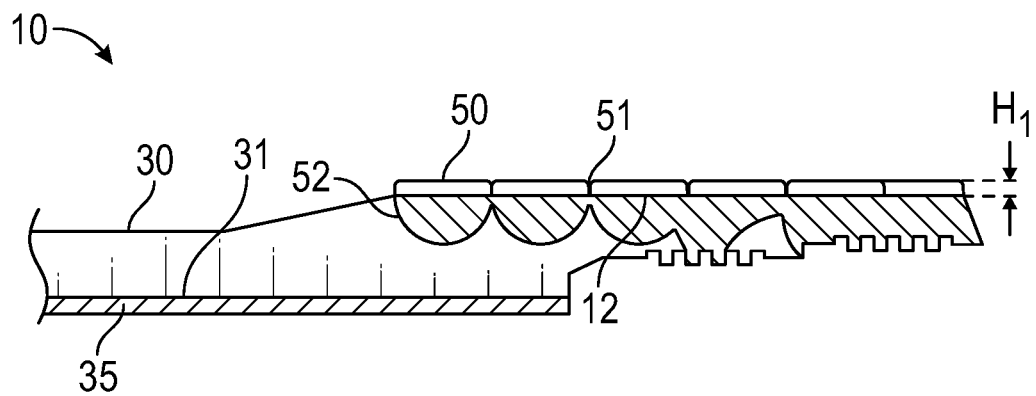
FIG. 5 shows a diagram of the externally upset box connection from FIG. 3 with six bands of weld material applied to the outer surface as well as the HAZ created by the welding process.

FIG. 5 shows a diagram of the partial cross section of the externally upset box connection 10 after weave or stringer beads have been applied. The weld beads 50 are shown as material applied to the outer surface 12 of the connection 10. The weld beads 50 may be made of hardbanding or buildup material. Suitable hardbanding material includes, but is not limited to, Arnco Technology's 350XT™, and suitable buildup material includes, but is not limited to, Arnco Technology's BUXT™. Between adjacent weld beads 50, low spots or valleys 51 may be formed. The thickness of the weld beads 50 at their lowest spots 51 is equal to or greater than the thickness $H_1$ required for building up the connection 10. The thickness $H_1$ may be between 3/32 inch and 5/32 inch (2.4 mm to 4.0 mm). The weld beads 50 may be formed through the application of weave beads or stringer beads. Typically, the weld beads 50 may be about 1 to 1-½ inches (25.4 mm to 38.1 mm) in width. While six weld beads 50 are shown, any number of weld beads 50 may be applied as necessary to cover the length of the outer surface 11. If a single layer of weld beads 50 is not thick enough, an additional layer (not shown) may be added on top of the weld beads 50. The heat from the application of the weld beads 50 may penetrate the connection 10 to form a HAZ 52. Due to the low heat input of the disclosed method, the HAZ 52 may not penetrate completely through the base material of the connection 10 to the inner surface 31. Once the welded area (HAZ 52 and weld beads 50) has cooled down to about 150° F., then grinding may be performed on the exterior surface of the weld beads 50.

Figure 6:
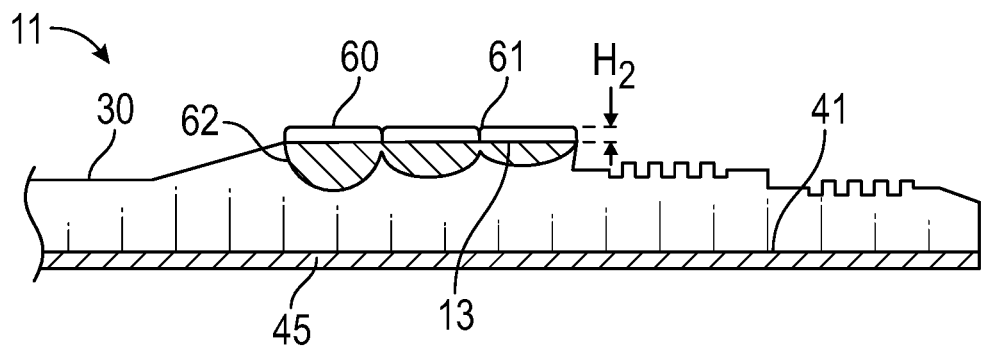
FIG. 6 shows a diagram of the externally upset pin connection from FIG. 4 with three bands of weld material applied to the outer surface as well as the HAZ created by the welding process.

FIG. 6 shows a diagram of the partial cross section of the externally upset pin connection 11 after weave or stringer beads have been applied. The weld beads 60 are shown as material applied to the outer surface 13 of the connection 11. The weld beads 60 may be made of the same hardbanding or buildup material suitable for the weld beads 50. Similar to the weld beads 50 applied on the connection 10, the weld beads 60 may have low spots or valleys 61 present between the weld beads 60. The thickness of the weld beads 60 at their lowest spots 61 is equal to or greater than the thickness $H_2$ required for building up the connection 11. The thickness $H_2$ may be between 3/32 inch and 5/32 inch (2.4 mm to 4.0 mm). The weld beads 60 may be formed through application of weave beads or stringer beads. Typically, the weld beads 60 may be about 1 to 1-1/2 inches (25.4 mm to 38.1 mm) in width. While three weld beads 60 are shown, the weld beads may be applied as necessary to cover the length of the outer surface 13. If a single layer of weld beads 60 is not thick enough, an additional layer (not shown) may be added on top of the weld beads 60. The heat from the weld beads 60 may penetrate the connection 11 to form a HAZ 62. Due to the low heat input of the disclosed method, the HAZ 62 may not penetrate completely through the base material of the connection 11 to the inner surface 41. Once the welded area (HAZ 62 and weld beads 60) has cooled down to about 150° F., then grinding may be performed on the exterior surface of the weld beads 60.

Figure 7:
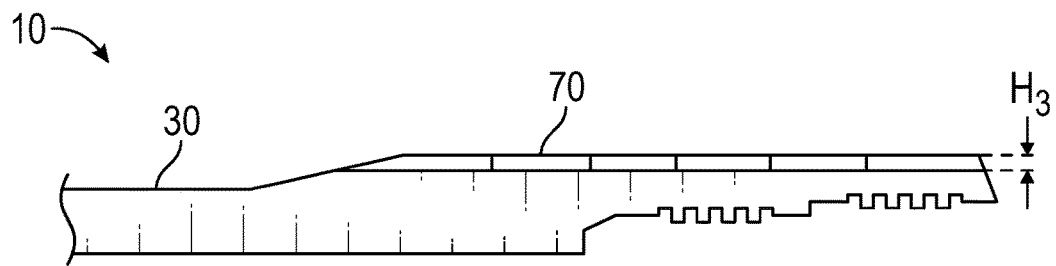
FIG. 7 shows a diagram of the externally upset box connection from FIG. 3 that has had all six bands of weld material ground to create a uniform and acceptable OD along the entire length of the connection.

FIG. 7 shows a diagram of the partial cross section of the externally upset box connection 10 after grinding of the weld beads 50 (whether hardbanding or buildup material). The ground weld beads 70 have been reduced from thickness $H_1$ to thickness $H_3$ to meet operational needs and to eliminate the valleys 51. While not shown, impact of the heat of welding (depicted as HAZ 52 in FIG. 5) is still present.

Figure 8:
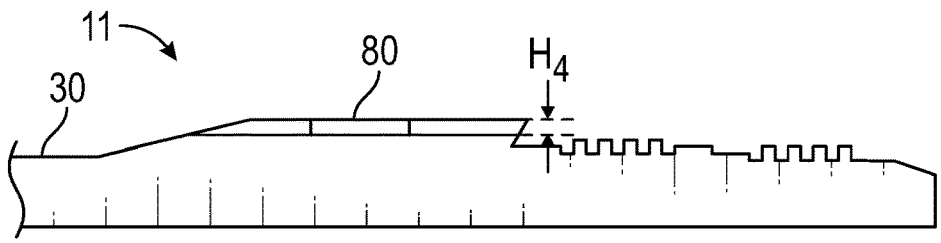
FIG. 8 shows a diagram of the externally upset pin connection from FIG. 4 that has had all three bands of weld material ground to create a uniform and acceptable OD along the entire externally upset length of the connection.

FIG. 8 shows a diagram of the partial cross section of the externally upset pin connection 11 connected to the tube body 14 from FIG. 6 after grinding of the weld beads 60 (whether hardbanding or buildup material). The ground weld beads 80 have been reduced from thickness $H_2$ to thickness $H_4$ to meet operational needs and to eliminate the valleys 61. In some embodiments, where the OD of the outer surface 12 is the same as the OD of the outer surface 13, the thickness $H_3$ will be the same the thickness $H_4$. While not shown, impact of the heat of welding (depicted as HAZ 62 in FIG. 6) is still present.

Figure 9:
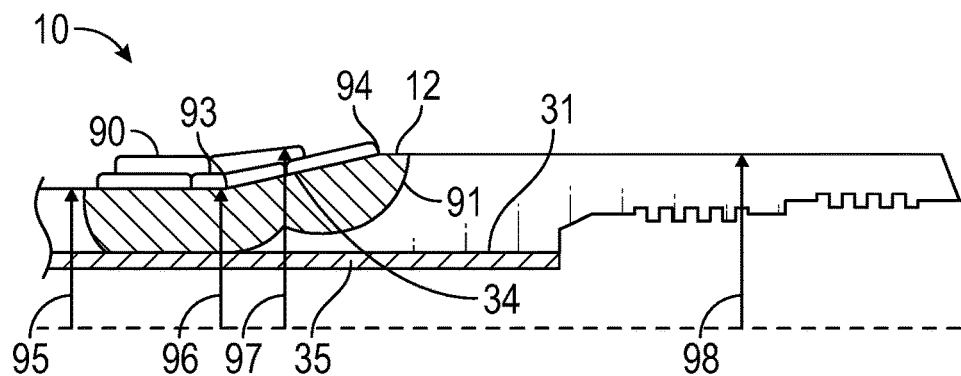
FIG. 9 shows a diagram of the externally upset box connection from FIG. 3 that has had multiple bands of weld material applied to the external taper of the connection as well as the HAZ created by the welding process.

FIG. 9 shows a diagram of the partial cross section of the externally upset box connection 10 connected to the tube body 14 from FIG. 3 after weave or stringer beads have been applied to the external taper 34. The external taper 34 has a first side 93 and a second side 94, where the first side 93 is proximate to a first part 95 of the tube body 14 and the second side 94 is proximate to the outer surface 12. At the first side 93, the external taper 34 has an outer diameter 96 equal to the outer diameter of the tube body 14. At the second side 94, the external taper 34 has an outer diameter 97 greater than outer diameter 98 of the upset connection outer surface 12. The weld beads 90 are shown as material applied to the outer surface of the external taper 34. The weld beads 90 may be made of the same materials suitable for the weld beads 50, 60. The thickness of each weld bead may be between 3/32 inch and 5/32 inch (2.4 mm to 4.0 mm). The weld beads 90 may be formed through the application of weave beads or stringer beads. Typically, the weld beads 90 may be about 1 to 1½ inches (25.4 mm to 38.1 mm) in width. While five weld beads 90 are shown, any number of weld beads 90 may be applied as necessary to extend the external taper 34. This will typically be done with two layers of the weld beads 90, as shown, however, the number of layers may vary as required to increase the OD of the outer surface 30 to meet or exceed the OD of the outer surface 12 in order to extend the taper 34. The heat from the application of the weld beads 90 may penetrate the connection 10 to form a HAZ 91. Due to the low heat input of the disclosed method, the HAZ 91 may not penetrate completely through the base material of the connection 10 to the inner surface 31. Once the welded area (HAZ 91 and weld beads 90) has cooled down to about 150° F., then grinding may be performed on the exterior surface of the weld beads 90.

Figure 10:
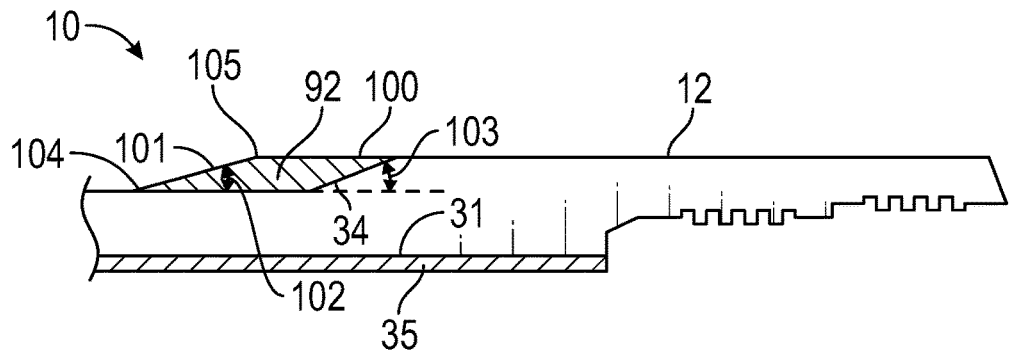
FIG. 10 shows a diagram of the externally upset box connection from FIG. 3 that has had the bands of weld material ground to create a uniform and acceptable OD along the entire length of the connection and has had the extended external taper ground to the appropriate angle for the connection.

FIG. 10 shows a diagram of the partial cross section of the externally upset box connection 10 connected to the tube body 14 from FIG. 9 after grinding of the weld beads 90. The ground weld beads 92 have been reduced in thickness such that the outer diameter 97 has been reduced to the outer diameter 98 to match the thickness of the upset connection 12 and forming a taper 101 the angle 102 to match the angle 103 between the surface 12 and the external taper 34 to extend the external taper 34. Thus, the ground weld beads 92 have an outer surface 100 that is flush with the outer surface 12 of the externally upset box connection 10 and form the new external taper 101 that is parallel to external taper 34. The new external taper 101 having its own first side 104 and its own second side, where the first side 104 is proximate to the tube body 14 and the second side 105 is proximate to the outer surface 12.

Figure 11:
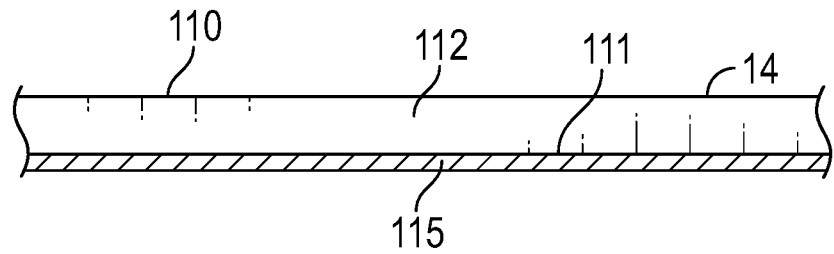
FIG. 11 shows a diagram of a tube body, that could represent that of a drill pipe joint or a workstring tubing joint from FIG. 1, or a slick body tubular from FIG. 2.

FIG. 11 shows a diagram of a partial cross section of the body wall 112 of a tubular 14 that could be from FIG. 1 or FIG. 2. The thickness of the tube body 14 is the difference between the OD at the outer surface 110 and the ID at the inner surface 111.

Figure 12:
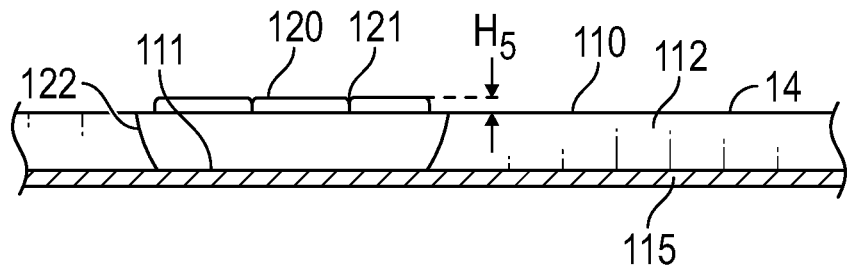
FIG. 12 shows a diagram of the tube body from FIG. 11 with weld material applied to the outer surface as well as the HAZ created by the welding process.

FIG. 12 shows a diagram of the partial cross section of the wall 112 of the tube body 14 from FIG. 11. The thickness of the tube body 14 may be small enough that even low heat welding will result in a HAZ 122 that penetrates through the wall of the tube body 14 to the inner surface 111. Despite this, the combination of no preheat, lower voltage, lower amperage, and the use of low heat welding reduces metallurgical changes to the base material such that the mechanical properties of the body wall 112 are not compromised. Weld beads 120 may be applied to the outer surface 110 to add buildup material to the tubular 14. The weld beads 120 are added to increase the thickness of the tubular 14, defined initially as the distance between the OD of the outer surface 110 and an ID of the inner surface 111 of the tubular 14. The weld beads 120 may be made of the same material suitable for the weld beads 50, 60, 90. While only three weld beads 120 are shown, any number of weld beads 120 may be applied. The thickness $H_5$ of the weld beads 120 may be added to the initial thickness of the tubular 14 to place the tubular's OD and wall thickness within the usable range for oilfield operations. The thickness $H_5$ may be between 3/32 inch and 5/32 inch (2.4 mm to 4.0 mm). Similar to the weld beads 50 on the connection 10, low spots or valleys 121 may be present between the weld beads 120. Once the welded area (HAZ 122 and weld beads 120) has cooled down to about 150° F., then grinding may be performed on the exterior surface of the weld beads 120.

Figure 13:
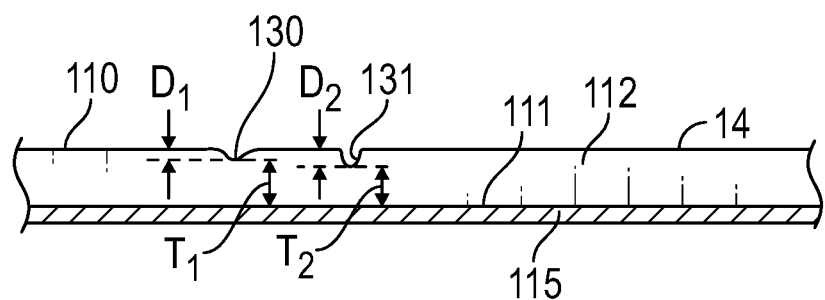
FIG. 13 shows a diagram of the tube body from FIG. 11 with two deep imperfections penetrating into the wall thickness of the tube body.

FIG. 13 shows a diagram of the partial cross section of the wall 112 of the tube body 14 from FIG. 11 with imperfections 130, 131 on the tube body 14 of depth $D_1$ and $D_2$ that cause the remaining body wall thickness $T_1$ and $T_2$ to be unacceptably less than the original thickness, which was the difference between the OD at the outer surface 110 and the ID at the inner surface 111.

Figure 14:
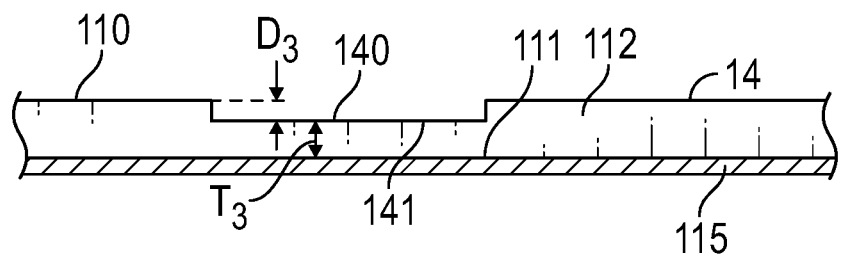
FIG. 14 shows a diagram of the tube body from FIG. 11 with a recess created by removing base material from the tube body to remove the imperfections from FIG. 13.

FIG. 14 shows a diagram of the partial cross section of the wall 112 of the tube body 14 from FIG. 13 with the imperfections 130, 131 on the tube body 14 removed after grinding a recess 140 into the outer surface 110 of the tube body 14 to a certain depth $D_3$ leaving a remaining body wall thickness $T_3$ (the difference between the inner surface 111 and the recessed surface 141) that is unacceptably less than the original thickness (the difference between the OD at the outer surface 110 and the ID at the inner surface 111).

Figure 15:
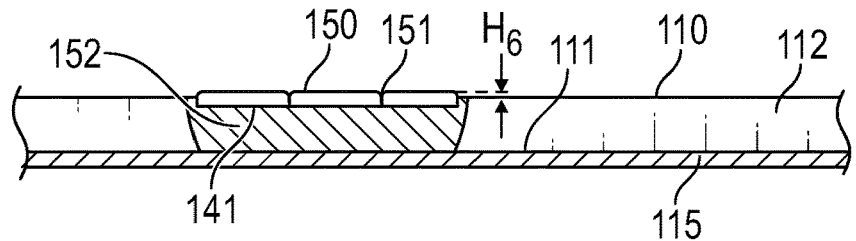
FIG. 15 shows a diagram of the tube body from FIG. 11 with weld material applied within the recess that causes the repaired area to have a larger OD than the adjacent OD of the tube body.

FIG. 15 shows a diagram of the partial cross section of the wall 112 of the tube body 14 from FIG. 14. The thickness of the tube body 14 may be small enough that even low heat welding will result in a HAZ 152 that penetrates through the wall of the tube body 14 to the inner surface 111. Despite this, the combination of no preheat, lower voltage, lower amperage, and the use of low heat welding reduces metallurgical changes to the base material such that the mechanical properties of the body wall 112 are not compromised. Weld beads 150, made of the same materials suitable for weld beads 50, 60, 90, 120, may be applied to the recessed surface 141 of the recess 140 to add buildup material in the recess 140. While only three weld beads 150 are shown, any number of weld beads 150 may be applied as necessary to build up the recessed surface 141. The weld beads 150 are added to build up the recess 140 to a height 116 that results in an OD and thickness greater than that of the original tube body 14, which was the difference between the OD at the outer surface 110 and the ID at the inner surface 111. Similar to the weld beads 120 on the tube body 14 from FIG. 12, low spots or valleys 151 may be present between the weld beads 150. Once the welded area (HAZ 152 and weld beads 150) has cooled down to about 150° F., then grinding may be performed on the exterior surface of the weld beads 150.

Figure 16:
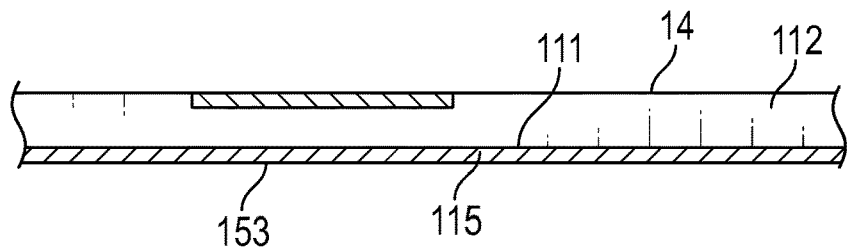
FIG. 16 shows a diagram of the tube body from FIG. 11 with the weld material ground to create a uniform and acceptable OD along the entire length of the tube body.

FIG. 16 shows a diagram of the partial cross section of the wall 112 of the tube body 14 from FIG. 15 after grinding of the weld beads 150. Similar to the connections 10, 11, the weld beads 150 may be ground down to provide a uniform surface and/or to match a predetermined OD or thickness for the built-up tubular section 14 of the tubular 1 or 2 that is suitable for oilfield operations. The ground weld beads 153 have been reduced by thickness 116 to create a uniform OD and meet operational needs after eliminating the valleys 151.

Figure 17:
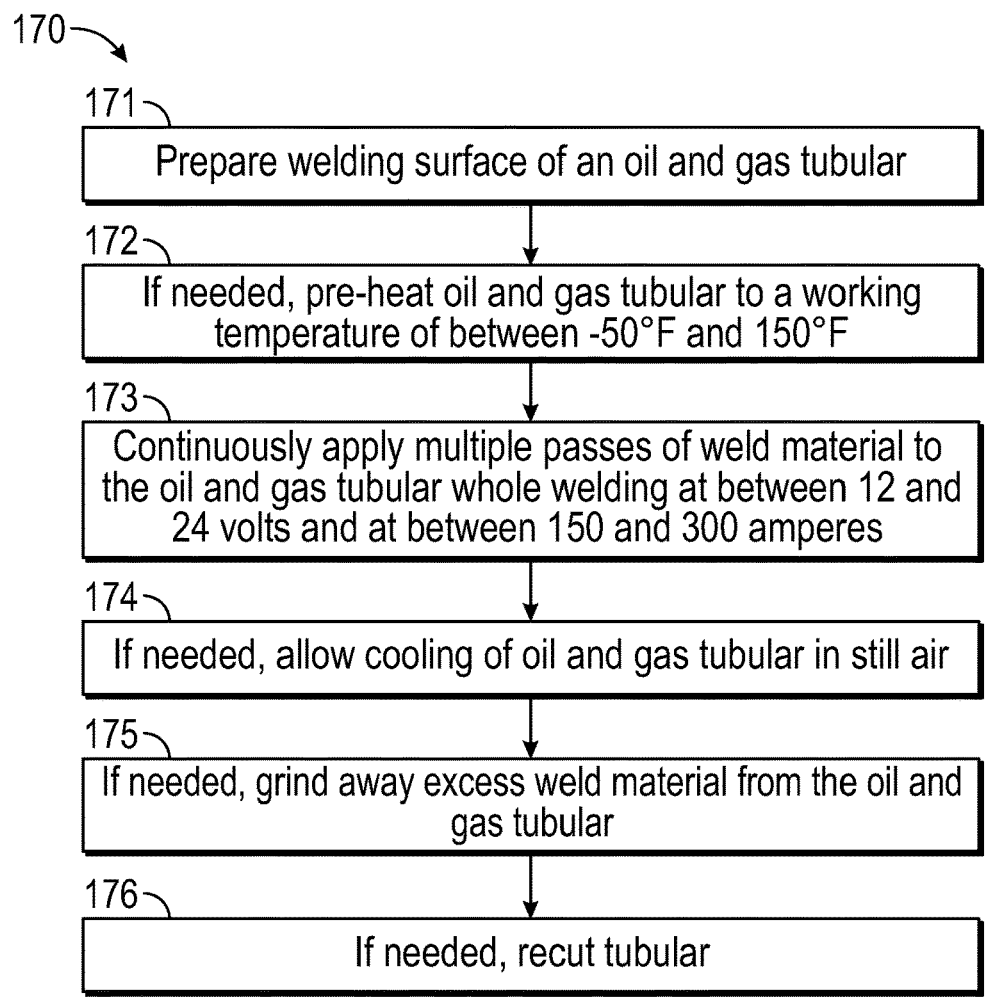
FIG. 17 shows a flowchart of a method for a low heat input welding process according to one embodiment of the present disclosure.

FIG. 17 shows a method 170 for applying material to the surface of a connection 10, 11, 20, 21 or a tube body 14, 22 according to one embodiment of the present disclosure. In step 171, the outer surface 12, 13, 20, 21, 30 of the connection 10, 11 and/or tube body 14, 22, respectively, may be prepared for application of the weld beads 50, 60, 90, 120, 150. The area where the weld material will be applied needs to be free of all foreign matter and debris such as rust, dirt, grease, oil, paint, and pipe coating. In some embodiments, the preparation step may include the outer surface 12, 13, 20, 21, 30 being prepared using a side-grinder and cup-brush to produce a sufficiently clean surface. "Buffing" the weld area surface may be performed but may or may not be sufficient. Further cleaning with some grinding may be necessary. In some embodiments, preparation may include grinding on the outer surface 12, 13, 20, 21, 30 to form a recess 140 that may be filled in with weld beads 50, 60, 90, 120, 150.

In step 172, optional preheating may be performed. The preheating in step 172 is significantly less than in GMAW, and is only used to raise the temperature of the outer surface 12, 13, 20, 21, 30 to a working temperature of between −50° F. and 150° F. In some embodiments, the working temperature is between 0° F. and 100° F. In some embodiments, the working temperature is an inside ambient temperature of about 70° F. Excessive preheating (over 150° F.) should not be used with this method. The reduction of preheating in step 172 or its absence reduces the amount of time required to prepare the base material for welding and reduces the risk of hardness and embrittlement of the base material within the HAZ 52, 62, 91, 122, 152.

In step 173, the weld material may be applied to the outer surface 12, 13, 20, 21, 30 to form the weld beads 50, 60, 90, 120, 150. The weld material may be applied using a low heat input welding process. The weld material may be applied in multiple bands continuously until the desired portion of the outer surface 12, 13, 20, 21, 30 is covered. In some embodiments, continuous application means subsequent bands are applied without an intervening cooling step. In some embodiments, continuous application means that application of a subsequent band begins less than one hour after the completion of the previous band. In some embodiments, continuous application means that application of a subsequent band begins less than five minutes after the completion of the previous band. In some embodiments, continuous application means that application of a subsequent band begins immediately after the completion of the previous band. Since the weld material, often in the form of a consumable wire, is applied with a width of about 1 to 1-½ inches (25.4 mm to 38.1 mm), multiple passes are often required to cover the upset portion of the connection 10, 11 or the slick connection 20, 21 or the tube body 14. The continuous application of weld material greatly reduces the welding time; since it is not necessary to allow each weave bead to completely cool before applying another, adjacent weave bead. The welding step may be performed, but is not limited to, using DCEP polarity with voltages around 18 volts. In some embodiments, the voltages may be between 15 and 20 volts. In some embodiments, the voltage may be between 12 and 24 volts. In some embodiments, the electrical current during welding may be around 240 amperes. In some embodiments, the electrical current may be between 220 and 260 amperes. In some embodiments, the electrical current may be between 150 and 300 amperes. A person of skill in the art will recognize that oil and gas tubulars may vary in composition and physical properties, and, as such, the voltages and amperages used in some embodiments may be varied accordingly. Further, some embodiments may be applicable to tubulars suitable for use outside of the oil and gas industry. While voltages and amperages may vary by the welding application, energy added to the weld process in the form of heat is lower than conventional welding. In some embodiments, the welding power may be 7.2 kilowatts or less. In some embodiments, the welding power may be 6.2 kilowatts or less. In some embodiments, the welding power may be 5.3 kilowatts or less. Examples of this completed step 173 are shown in FIGS. 5, 6, 9, 12, 15.

The combination of no preheat, lower voltage, lower amperage, and the use of the CMT welding process inputs far less heat into the welded area than with the GMAW method, which allows for the application of multiple, adjacent weave beads to the entire externally upset length of a worn connection. As shown in FIGS. 5, 6, 9, 12, 15, these weld beads may protrude above the external surface of the worn tubing connection to a height that causes thicknesses $H_1$, $H_2$, $H_5$ of the weld beads 50, 60, 120 to be greater than the maximum acceptable thickness $H_3$, $H_4$, $H_6$.

If the added thickness of the buildup material does not increase the OD to meet the acceptable OD, then another layer of buildup material may be applied until the acceptable ODs are reached. This can be done in a continuous process, by adding multiple, adjacent weave beads atop the initial weave beads or this can be done in a discontinuous process, by allowing the connection to cool and then reapplying over the first layer of weave beads.

Due to the low heat input, it is not necessary to measure the temperature of the next area to be welded after each application of a weave bead or even a combination of weave beads when the application is done with the disclosed low heat input welding process. This eliminates the added time and complication of measuring temperatures during the continuous welding process.

In step 174, after the completion of the application of all the necessary weld beads, the connection 10, 11, 20, 21 or a tube body 14, 22 may, optionally, be cooled in ambient air, rather than slowly cooled using thermally insulating blankets or cooling cans or insulation. This is particularly true if the ambient temperature in which the tubing connections cool is around 70° F. or between 0° F. and 100° F. or possibly between −50° F. and 150° F. This allows the welded area to cool more quickly and eliminates the complication of post-weld slow-cooling. In some embodiments, the welded area may be allowed to cool to 150° F. or below before any further handling of the connection 10, 11, 20, 21 or a tube body 14, 22. In some embodiments, the connection 10, 11, 20, 21 or a tube body 14, 22 may be used without any cooling at all. By avoiding slow-cooling, just as avoiding extensive preheating, the method reduces the possibilities of mistakes during the slow-cooling and preheating steps that may result in compromised mechanical properties of the tubular 14, 22 or the connections 10, 11, 20, 21, such as, but not limited to, cracking and embrittlement.

The weld beads applied to the externally upset connection 10, 11 or the slick connection 20, 21 or the tube body 14, 22 may have a thickness that, when combined with the OD of the worn connection 10, 11, 20, 21 or tube body 14, 22 exceeds the required OD for a usable connection or tubular, respectively.

In step 175, the weld beads 50, 60, 90, 120, 150 may be ground or machined from thicknesses $H_1$, $H_2$ to acceptable thicknesses $H_3$, $H_4$ or, in the case of $H_6$, ground down to 0). In some embodiments, the machining may be performed using a lathe insert or another method to create a uniform OD across the entire externally upset length of the connection 10, 11 or the OD of the slick connection 20, 21 or the length of the tube body 14, 22 with a smooth surface. Examples of the results of this step are shown in FIGS. 7, 10 for the box connection 10, FIG. 8 for the pin connection 11, and FIG. 16 for the tube body 14. In the cases where the weld beads 50, 60, 90, 120, 150 are a hardbanding material, step 175 may be optional.

In step 176, once the uniform OD across the entire externally upset length of the connection 10, 11 is within the acceptable range, a lathe or Computer Numeric Control (CNC) machine or another suitable device may be used to recut the connection 10, 11. This step may not be necessary for slick connections 20, 21. Typically but not always, workstring tubing may have two-step, double-shoulder connections where the connections 10, 11 have sufficient lengths to allow for multiple recuts, which allow for the elimination of some material and creation of new threads out of the existing material comprising the connections. Though the external upset 34 can be extended using weld material 90 as shown in FIGS. 9, 10. Step 176 does not apply to the tube body 14. At the completion of this step 176, the connections 10, 11 are suitable for use in oilfield operations.

The method 170 may be used for the application of hardbanding to the connections 10, 11. In some embodiments, method 170 may be used to apply buildup material to the connections 10, 11, 20, 21 and then used a second time to apply hardbanding to the connections 10, 11, 20, 21.

While the disclosure has been described with reference to exemplary embodiments, it will be understood that various changes may be made, and equivalents may be substituted for elements thereof, without departing from the scope of the disclosure. In addition, many modifications will be appreciated to adapt a particular instrument, situation, or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method comprising:
    applying at least one layer of a buildup material to a first taper and a first part of a tube body of a workstring tubing joint using cold metal transfer, wherein the first taper is connected to the tube body on a first side of the first taper and to a workstring tubing upset connection on a second side of the first taper, wherein the first taper has a first side outer diameter that is the same as an outer diameter of the tube body and a second side outer diameter that is the same as an outer diameter of a workstring tubing upset connection, and wherein the buildup material is selected to have a welded hardness within 10 HRC of a hardness of the workstring tubing joint; and wherein the applied at least one layer of buildup material increases the first side outer diameter of the first taper until said first side outer diameter exceeds the second side outer diameter;
    grinding or machining the at least one layer of buildup material until the outer diameter of the first taper matches the outer diameter of the workstring tubing upset connection; and
    forming a second taper with its own first side on the first part of the tube body.

2. The method of claim 1, wherein the at least one layer comprises multiple bands that are applied adjacently and continuously.

3. The method of claim 1 wherein the at least one layer comprises a first layer and a second layer and the second layer is applied after the first layer without an intervening cooling step.

* * * * *